(12) United States Patent
Hoshino

(10) Patent No.: US 9,773,271 B2
(45) Date of Patent: Sep. 26, 2017

(54) PRESENTING A RECOMMENDATION BASED ON USER PREFERENCE

(71) Applicant: SONY CORPORATION, Tokyo (JP)

(72) Inventor: Masaaki Hoshino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 691 days.

(21) Appl. No.: 14/289,829

(22) Filed: May 29, 2014

(65) Prior Publication Data

US 2014/0279209 A1    Sep. 18, 2014

Related U.S. Application Data

(63) Continuation of application No. 11/909,952, filed as application No. PCT/JP2006/307063 on Apr. 3, 2006.

(30) Foreign Application Priority Data

Apr. 1, 2005  (JP) ................................ 2005-105685
Apr. 3, 2006  (JP) ................................ 2006-102349

(51) Int. Cl.
*G06F 17/00* (2006.01)
*G06Q 30/06* (2012.01)
*G06F 17/30* (2006.01)

(52) U.S. Cl.
CPC ... *G06Q 30/0631* (2013.01); *G06F 17/30743* (2013.01); *G06F 17/30749* (2013.01); *G06F 17/30766* (2013.01); *G06F 17/30752* (2013.01)

(58) Field of Classification Search
CPC ...................... G06Q 30/0631; G06F 17/30752
See application file for complete search history.

(56) References Cited

U.S. PATENT DOCUMENTS

| 6,134,547 A | 10/2000 | Huxley et al. |
| 2001/0045962 A1 | 11/2001 | Lee et al. |

(Continued)

FOREIGN PATENT DOCUMENTS

| JP | 06-259424 | 9/1994 |
| JP | 11-296534 | 10/1999 |

(Continued)

OTHER PUBLICATIONS

Herlocker, Jonathan L., et al.; "Explaining collaborative filtering Recommendations;" CSCW; Dec. 2000; Dept. of Computer Science and Engineering; University of Minnesota; pp. 241-250.

*Primary Examiner* — Andrew McIntosh
(74) *Attorney, Agent, or Firm* — Oblon, McClelland, Maier & Neustadt, L.L.P.

(57) ABSTRACT

The present invention relates to an information processing system, method, and program which are capable of presenting a more persuasive recommendation reason. When a music CD meeting a user's preference is selected by a server apparatus, a recommendation screen is displayed onto the display of the user apparatus. The detailed information 11 including the titles of the pieces of music included in the recommended music CD and a recommendation reason 12 are displayed on the recommendation screen. A comment on the music CD (recommended music CD), which is written by a certain music commentator, is used for the display of the recommendation reason 12. Out of the comment, the words that has served for the recommendation or the sentences including that word are underlined, etc., and thus is displayed more noticeably than the other words and sentences. The present invention can be applied to an apparatus which selects and presents an item meeting the user's preference.

14 Claims, 16 Drawing Sheets

(56) References Cited

U.S. PATENT DOCUMENTS

| | | | |
|---|---|---|---|
| 2003/0106058 A1* | 6/2003 | Zimmerman | H04N 7/163 725/46 |
| 2004/0107821 A1 | 6/2004 | Alcalde et al. | |
| 2004/0205558 A1 | 10/2004 | Holloway et al. | |
| 2006/0143158 A1* | 6/2006 | Ruhl | G06F 17/30864 |
| 2006/0282258 A1 | 12/2006 | Tsuzuki et al. | |

FOREIGN PATENT DOCUMENTS

| | | | |
|---|---|---|---|
| JP | 2004-355340 | 12/2004 | |
| NL | WO 2004043067 A2 * | 5/2004 | H04N 7/163 |

\* cited by examiner

FIG. 5
MARVELOUS JAPANESE ARTIST, PYOUKU, WHO IS PROUD OF OVERWHELMING ORIGINALITY. ALTHOUGH JUST AFTER SHE MADE AN ADMIRABLE ALBUM "DEBUT", SHE STILL HAS PROFUNDITY. "ARMY" HAS STINGING TUNE...
⇩
"ORIGINALITY", "JAPANESE", "PROFOUNDNESS",...
 "GREAT"

FIG. 7

MUSIC CD A (ORIGINALITY, JAPANESE, ... , $x_1, x_2, x_3, ...$ )

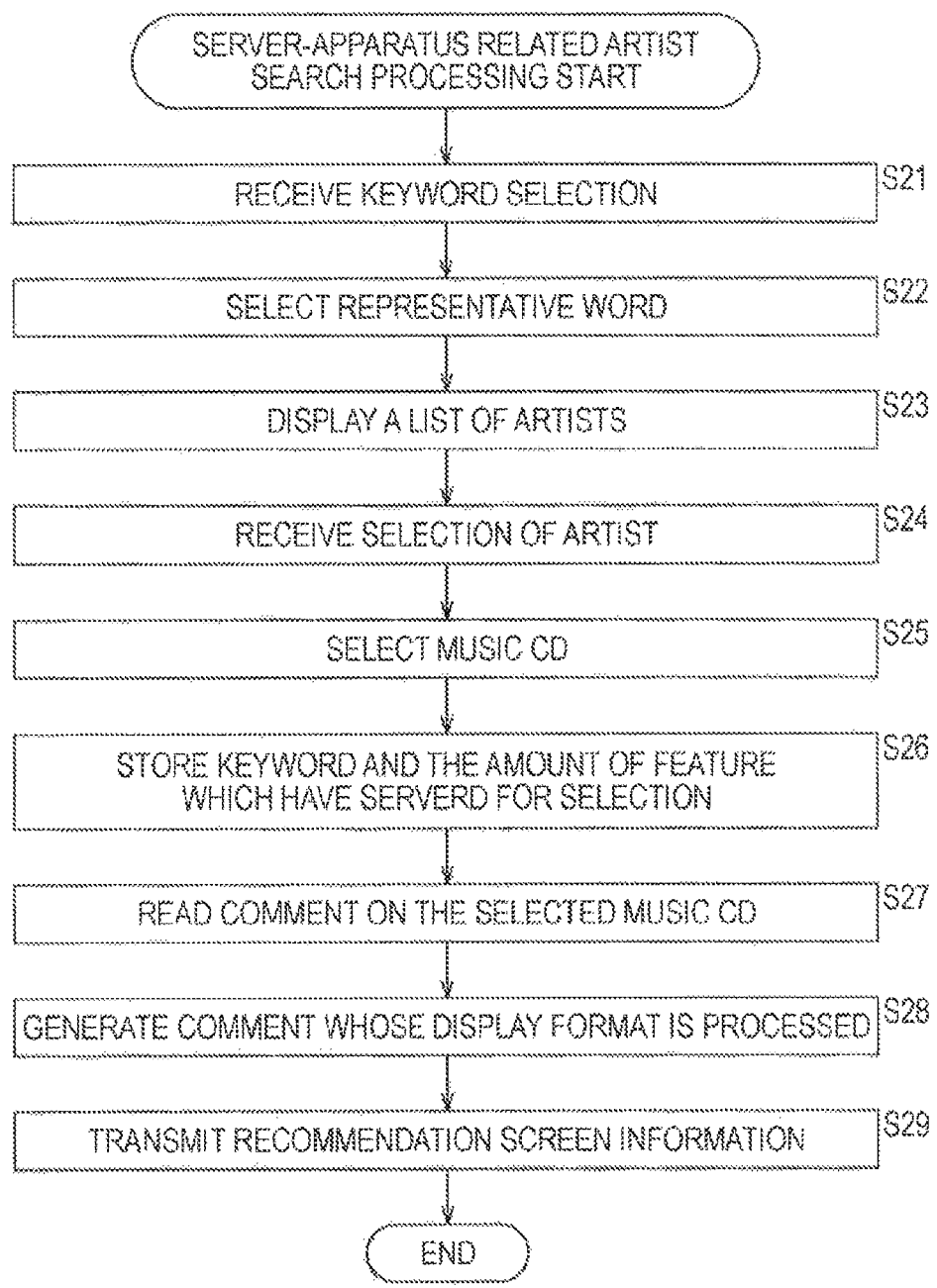

PRESENTING A RECOMMENDATION BASED ON USER PREFERENCE

CROSS-REFERENCE TO RELATED APPLICATIONS

This application is a continuation of U.S. application Ser. No. 11/909,952, filed Sep. 2, 2008, which is a national stage entry of PCT/JP2006/307063 filed Apr. 3, 2006, which is based upon and claims the benefit of priority from Japanese Application No. 2005-105685 filed Apr. 1, 2005, and Japanese Application No. 2006-102349 filed Apr. 3, 2006, the entire contents of all of which are incorporated herein by reference.

TECHNICAL FIELD

The present invention relates to an information processing system, method, and program. More particularly, the present invention relates to an information processing system, method, and program which are capable of presenting a more persuasive recommendation reason.

BACKGROUND ART

In a server-client system, it has been carried out to date that when a sever recommends a certain item, such as a book, a television program, etc., to the user of a client apparatus, a recommendation reason, together with the information on the recommended item, has been displayed onto the screen of the client apparatus.

The recommendation reason is displayed, for example on the basis of the following two methods.

1. Collaborative Filtering

For the user who has selected a certain book, the server apparatus recommends the books in which the other people who have selected the same book as that user or the other people who have the same preferences are interested, and presents the reason, such as "Those who selected the book you have selected also have purchased the book XXX in addition".

That is to say, here, for the recommendation reason of "the book XXX", the fact that the purchases have been made by those who selected "this book" similarly as the user who is currently being recommended the book.

2. Presentation by Highlighting the Word that has Served for Recommendation

For example, when the user, who is going to receive a recommendation of programs, often views sports programs (when the server apparatus obtains the viewing history of the client apparatus), the server application recommends sports programs, and presents a reason, such as "These are "sports" programs in the category you often view.""

That is to say, here, for the recommending reason of a certain sport program, the fact that the category of the programs the user often views and the category of the recommended programs are "sports", which are the same, is shown.

In the same manner, when the user who is going to receive a recommendation has an interest in travels (when the server apparatus obtains, in advance, the information that the user is interested in travels by getting replies to a questionnaire, etc.), the server apparatus recommends hot-spring tour programs, and presents the reason, such as "The keywords of the programs you often view are a "hot spring", "health", and a "travel".

That is to say, here, for the recommendation reason of a certain hot-spring tour program, the fact that the contents of the program are related to a "hot spring", "health", and a "travel" in which the user is interested is shown using the keywords.

The technique of presenting a recommendation reason of programs has been disclosed in Japanese Unexamined Patent Application Publication No. 2004-355340. Also, the importance of teaching a reason when something is recommended to a person has been disclosed in the non-patent document as follows: Jonathan L. Herlocker, Joseph A. Konstan, and John Riedl Dept. of Computer Science and Engineering University of Minnesota Explaining Collaborative Filtering Recommendations

DISCLOSURE OF INVENTION

Problems to be Solved by the Invention

The above-described sentences of recommendation reasons are simple sentences produced by replacing a part of fixed-format sentences with the contents selected by the user or the contents in accordance with the user's preference. Thus, there has been a problem in that the sentences lack appeal. However, it is difficult to automatically generate sophisticated sentences as the sentences for presenting recommendation reasons by the server apparatus.

In a real store, when a salesperson recommends goods to a customer, the salesperson explains the reason to the customer. In the same manner, in a server-client system, the presentation of the recommendation reason is very important, because it is expected to have the effect of convincing the user, relieving the user, and reducing the claims from the user who has purchased the recommended goods. Also, when the target of the recommendation is related to likes and tastes, since likes and tastes have been diversified, it is thought that the user needs to be convinced by presenting a certain degree of the detailed reasons of the recommendation in particular.

The present invention has been made in view of such circumstances, and an object is to make it possible to present a more persuasive recommendation reason.

Means for Solving the Problems

According to the present invention, there is provided an information processing system including: storage means for storing comment data on each item; and control means for controlling presentation of information on an item selected in accordance with the user's preference such that a word served for the selection of the item is displayed in a format different from other words out of words constituting the comment.

Here, the item includes not only the data that can be supplied to the user through a network or in the form of being recorded on a predetermined recording medium, but also a hardware (goods) provided as tangibles. For example, the item also includes a so-called content, such as a television program, a movie, a photograph, music, etc., (a moving image, a still image, sound, or the combination thereof, etc.), a home electric product, a food product, etc.

Also, the word that has served for selecting an item is not limited to one word, but may be a combination of a plurality of words.

The control means may control presentation of information on the item selected in accordance with the user's preference such that a sentence including a plurality of words including a word having served for the selection of the item is further displayed in a format different from other sentences constituting the comment.

The control means may display information on the item selected in accordance with the user's preference onto a screen of a user apparatus connected through a network.

The comment data stored by the storage means may be used for displaying information on an item on a predetermined Web site.

A word having served for the selection of the item may be the same word as the word included in preference information representing the user's preference, or the word corresponding to the word included in the preference information out of words included in meta-data of the item referenced at the time of selecting the item.

A word having served for the selection of the item may be the word obtained by verbalizing the feature quantity close to the feature quantity included in preference information representing the user's preference out of the feature quantity included in meta-data of the item referenced at the time of selecting the item.

The information system further includes other storage means for storing information indicating a relationship with a predetermined feature quantity, wherein when a predetermined word may be selected from words displayed in a format different from the other words as a word having served for the selection of the item, the control means may further select the feature quantities related to the selected predetermined word on the basis of the information stored in the other storage means, and display a list of the selected feature quantities.

When the item to be selected is music, the feature quantity may be an artist, and when the item to be selected is a movie, the feature quantity may be a director.

The other storage means may further store information indicating a degree of a relationship between a word and a predetermined feature quantity, and the control means may present a list of the feature quantities in descending order of the degree of the relationship.

When a predetermined feature quantity is selected from the list, the control means may further control presentation of information on an item such that a word having served for the selection of the item is displayed in a format different from other words out of the words constituting the comment on the item selected from the items provided by the predetermined feature quantity.

According to the present invention, there is provided a method of processing information of an information processing system including storage means for storing comment data on each item and presenting, as information on an item selected in accordance with a user's preference, information including a comment on the item, the method including the step of controlling presentation of information on the item selected in accordance with the user's preference such that a word served for the selection of the item is displayed in a format different from other words out of words constituting the comment.

According to the present invention, there is provided a program for causing a computer to perform processing for storing comment data on each item and presenting, as information on an item selected in accordance with a user's preference, information including a comment on the item, the processing including the step of controlling presentation of information on the item selected in accordance with the user's preference such that a word served for the selection of the item is displayed in a format different from other words out of words constituting the comment.

In an information processing system, method, and program of the present invention, the presentation of information on an item selected in accordance with a user's preference is controlled such that a word having served for the selection of the item is displayed in a format different from other words out of words constituting the comment.

Advantages

BY the present invention, it is possible to provide a more persuasive recommendation reason.

BRIEF DESCRIPTION OF THE DRAWINGS

FIG. 5 is a diagram illustrating an example of keyword selection.

FIG. 7 is a diagram illustrating an example of meta-data.

FIG. 18 is a flowchart illustrating the related-artist search processing of the server apparatus.

Figure 1:
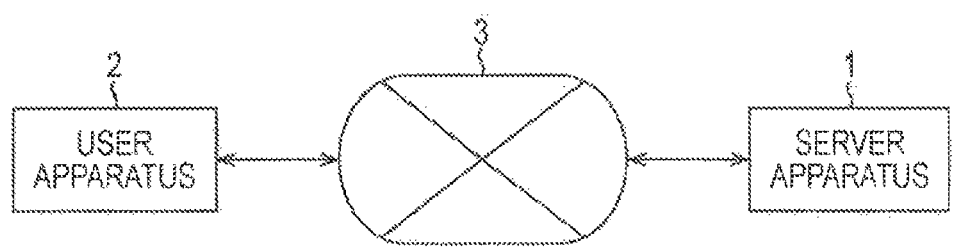
FIG. 1 is a block diagram illustrating an example of the configuration of a recommendation system according to an embodiment of the present invention.

REFERENCE NUMERALS 1 server apparatus, 2 user apparatus, 31 comment-data storage section, 32 keyword extraction section, 33 content storage section, 34 the feature quantity extraction section, 35 meta-data generation section, 36 meta-data storage section, 37 recommendation section, 38 detailed-information storage section, 39 corresponding dictionary storage section, 71 operation-history storage section, 72 the feature quantity extraction section, 73 verbalization section, 74 preference-information generation section, 75 preference-information storage section, 76 recommendation request section

BEST MODE FOR CARRYING OUT THE INVENTION

In the following, a description will be given of an embodiment of the present invention with reference to the drawings.

FIG. 1 is a block diagram illustrating an example of the configuration of a recommendation system according to an embodiment of the present invention.

This recommendation system is constituted by connecting a server apparatus 1 and a user apparatus 2 through a network 3. Although one user apparatus 2 is shown in FIG. 1, a plurality of user apparatuses 2 may be connected to the network 3 as a matter of course.

The server apparatus 1 manages information on various items, selects a predetermined item meeting the user's preference of the user apparatus 2 from the items whose information is managed, and supplies information on the selected item to the user apparatus 2 through the network 3.

In the user apparatus 2, a recommendation screen is displayed on the basis of the information transmitted from the server apparatus 1. On the recommendation screen, not only the detailed information on the recommended item, but also a recommendation reason is displayed. The recommendation reason is presented by a comment written about the recommendation target item, which is, for example displayed distinctly (highlighted) in a different format from the other words and sentences such that the words and the sentences having served for recommendation are noticeable.

That is to say, the server apparatus 1 is provided with a comment written about each item in advance, and the comment is used for the presentation of the recommendation reason.

The user apparatus 2 manages the preference information representing the user's preference. The user apparatus 2 requests the recommendation of an item meeting the user's preference by supplying the managed preference information to the server apparatus 1. At the time of recommendation of an item, the information specifying the category of the item on which the recommendation is requested, etc., is notified from the user apparatus 2 to the server apparatus 1.

Also, the user apparatus 2 displays a recommendation screen on the basis of the information transmitted from the server apparatus 1. The user can download the recommended item or apply for the purchase of the recommended item from the recommendation screen displayed on the user apparatus 2.

Figure 2:
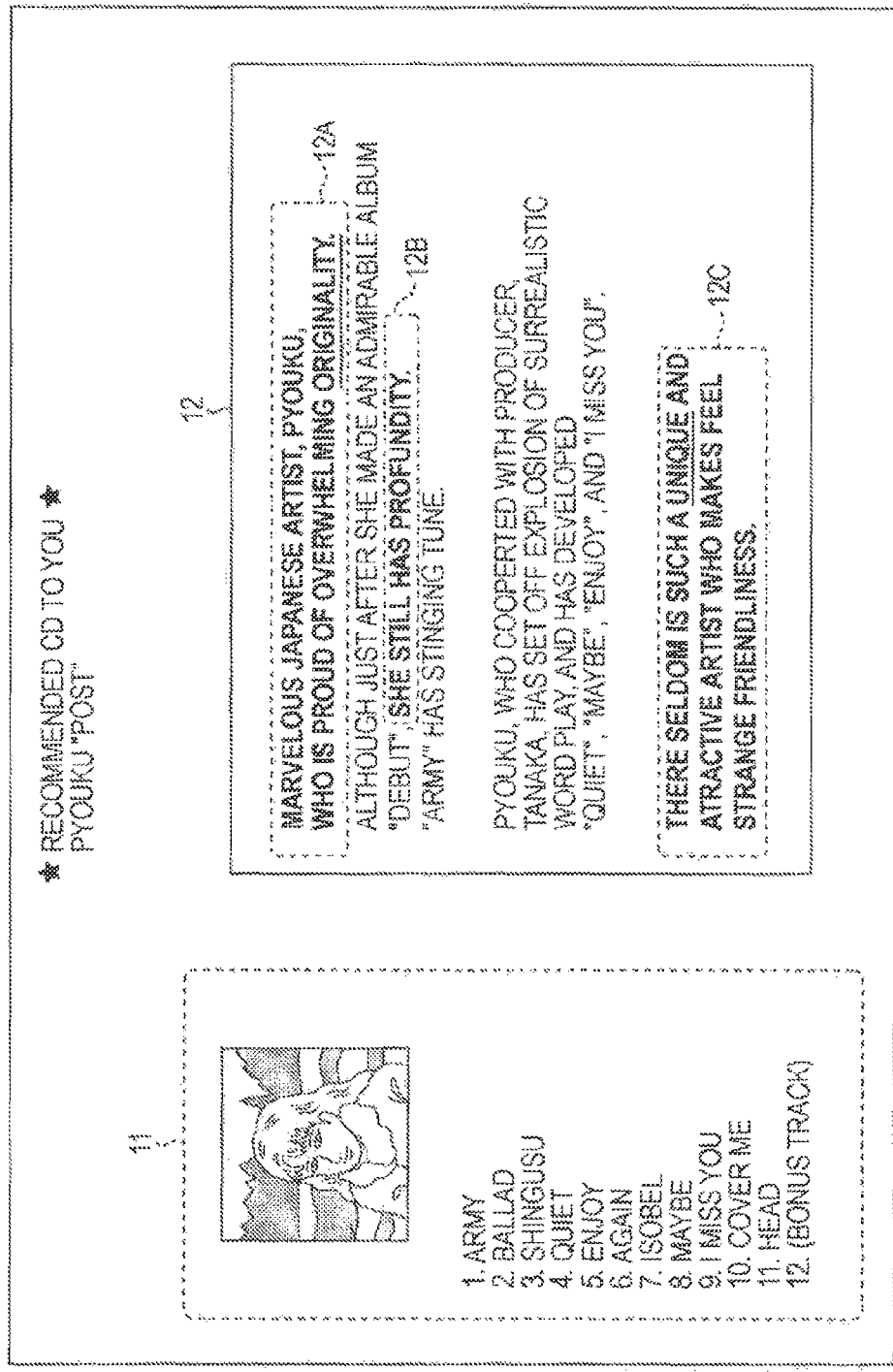
FIG. 2 is a view illustrating an example of a recommendation screen.

FIG. 2 is a view illustrating an example of the recommendation screen displayed by the user apparatus 2.

In the following, a description will be given mainly of the case where the category of the item on which a recommendation is requested is a music CD. However, in the case where the category of the item on which a recommendation is requested is other than a music CD, the selection of the item recommended and the display of the recommendation screen are performed by the server apparatus 1 and the user apparatus 2, respectively in the same manner.

In the example of the music CD recommendation screen shown in FIG. 2, the music CD with the artist name "Pyouku" and the title name "Post" is recommended as a music CD meeting the user's preference from the music CDs whose information is managed by the server apparatus 1, and the artist name and the title are displayed.

On the recommendation screen, the detailed information 11 which is the detailed information on the recommended CD and the recommendation reason 12 are displayed in addition to the artist name and the title.

In the example in FIG. 2, the jacket image of the recommended music CD and the titles of the pieces of music included in the CD are displayed as the detailed information 11. In this regard, in FIG. 2, the dotted lines indicate for the sake of convenience of the explanation, and are not actually shown on the screen.

Also, in the example in FIG. 2, a comment on the music CD "Post" written by a music commentator is displayed as the recommendation reason 12. Of the sentences included in this comment, the sentences 12A to 12C enclosed by the dotted lines are the sentences that are displayed in a different format from those of the other sentences, for example by being highlighted by a striking color, such as red, or bold-line characters. The sentences other than the sentences 12A to 12C are displayed in a quiet color compared with red, such as black, etc.

Also, the word "originality" included in the sentence 12A, the word "profundity" included in the sentence 12B, and the word "unique" included in the sentence 12C are underlined. Thereby, the user of the user apparatus 2 can distinguish these words from the other words.

The three underlined words are the words that have served for the selection in particular when the music CD "Post" is selected as the music CD meeting the preference of the user. Accordingly, the user can check the recommendation reason from the underlined words or the sentences including them.

For example, the user of the user apparatus 2 often listens to a music of a different melody from a general music, and thus it is expressed that the user is "highly creative" by the preference information. When the music CD "Post", whose comment includes words, such as "originality", "unique", etc., is selected as the music CD to be recommended, as shown in FIG. 2, the words "originality" and "unique", which relate to "creativity" in the meaning become the words that have served for the recommendation.

In this case, since the user of the user apparatus 2 often listens to a creative music by himself/herself, the user can confirm that the music CD "Post" whose feature is described by the words, such as "originality", "unique", etc., has been recommended.

Compared to the case where a simple sentence like a sentence produced by only replacing a part of a fixed-format sentence is presented, the user can be well convinced of the recommendation reason by displaying such a recommendation reason. For example, if a simple sentence like "This is similar to the pieces of music you are listening.", etc., is displayed in place of the recommendation reason 12 in FIG. 2, the user is difficult to know which part of the music is similar, and thus the recommendation reason lacks in persuasiveness.

Also, it becomes not necessary for the server apparatus 1 side to generate a sophisticated sentence expressing the recommendation reason using a comment prepared in advance on a case-by-case basis, and thus it is possible to present a recommendation reason including a sophisticated sentence with ease.

Furthermore, a comment expresses the feature of the recommended item, etc., and thus the server apparatus 1 can present the feature of the item, etc., and the recommendation reason to the user. This becomes particularly useful when the user apparatus 2 is a apparatus having a display of a relatively narrow display range.

The operations the server apparatus 1 displaying the recommendation screen as described above and the user apparatus 2 displaying a recommendation screen will be described later with reference to the flowcharts.

Figure 3:
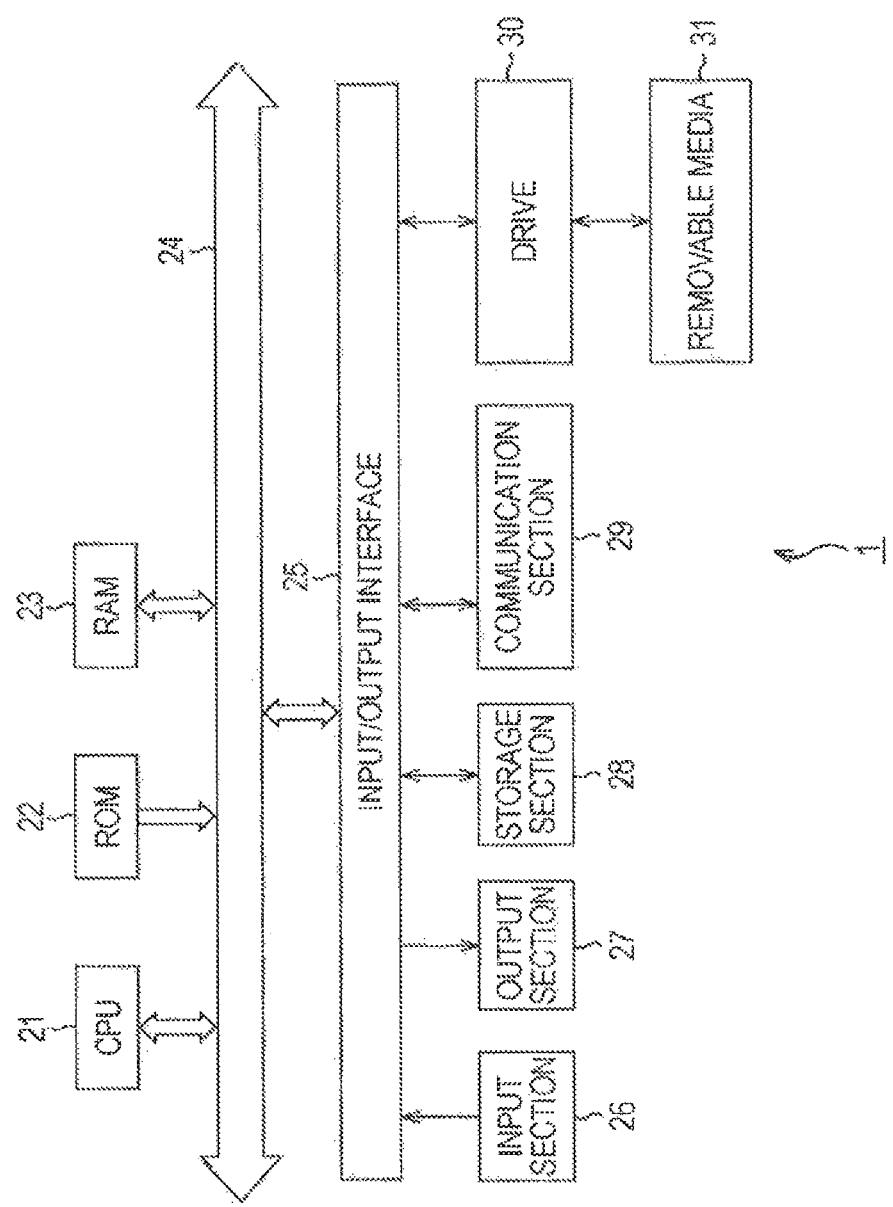
FIG. 3 is a block diagram illustrating an example of the hardware configuration of a server apparatus.

FIG. 3 is a block diagram illustrating an example of the hardware configuration of the server apparatus 1 in FIG. 1.

A CPU (Central Processing Unit) 21 executes various processing in accordance with the programs stored in a ROM (Read Only Memory) 22 or the programs loaded from a storage section 28 to a RAM (Random Access Memory)

23. Also, the RAM 23 appropriately stores necessary data, etc., in order for the CPU 21 to execute various programs.

The CPU 21, the ROM 22, and the RAM 23 are mutually connected through a bus 24. An input/output interface 25 is also connected to the bus 24.

An input section 26 including a keyboard, a mouse, etc., a display including an LCD (Liquid Crystal Display), etc., an output section 27 including a speaker, etc., a storage section 28 including a hard disk, etc., and a communication section 29 performing communication processing through the network 3 are connected to the input/output interface 25.

Also, a drive 30 is connected to the input/output interface 25 as necessary. Removable media 31 including a magnetic disk, an optical disc, a magneto-optical disc, or a semiconductor memory, etc., are appropriately attached to the drive 30, and the computer programs read from there are installed into the storage section 28 as necessary.

In this regard, the user apparatus 2 also has the same configuration as the configuration shown in FIG. 3. In the following, a description will be given by quoting the configuration in FIG. 3 as the configuration of the user apparatus 2.

Figure 4:
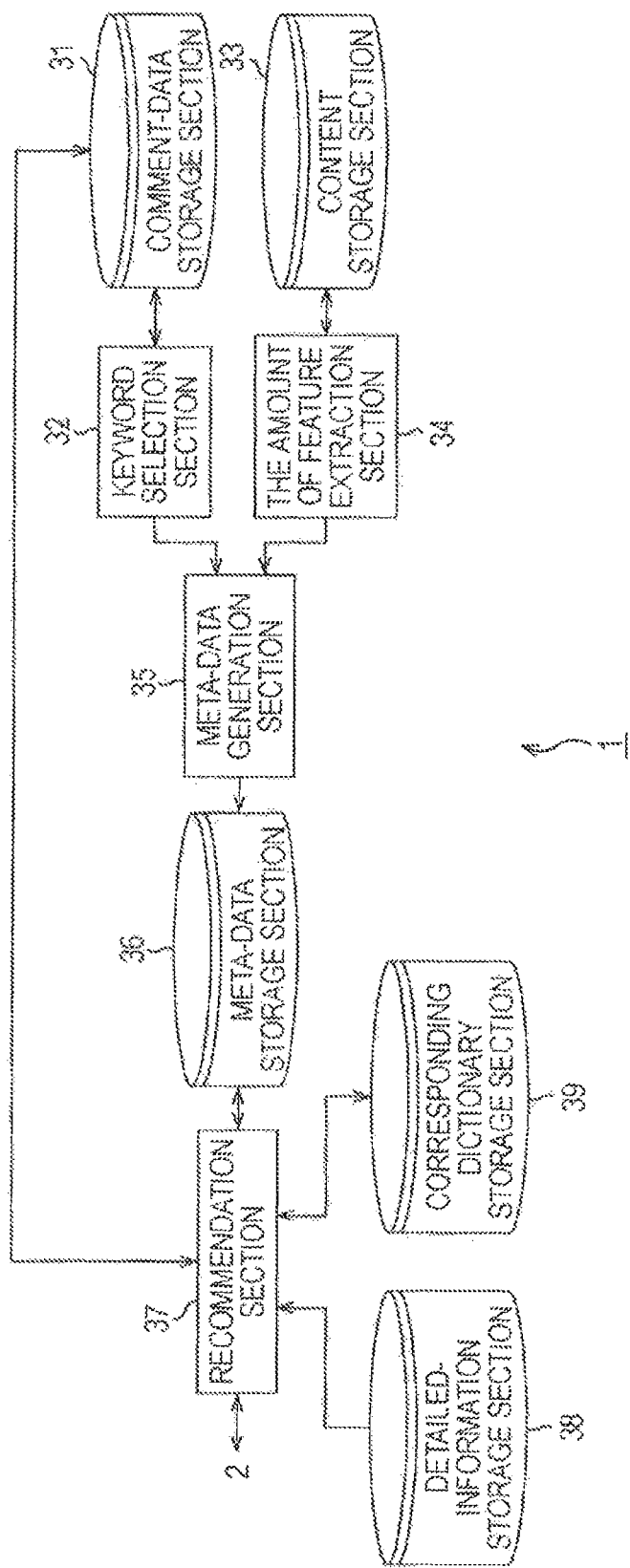
FIG. 4 is a block diagram illustrating an example of the functional configuration of the server apparatus.

FIG. 4 is a block diagram illustrating an example of the functional configuration of the server apparatus 1. At least a part of the functional sections shown in FIG. 4 is achieved by executing a predetermined program by the CPU 21 (the CPU of the server apparatus 1) in FIG. 3.

A comment-data storage section 31 stores a comment (comment data) on each item whose information is managed by the server apparatus 1. The comment also includes subjective sentences, such as criticisms, etc., by critics in addition to the sentences describing the contents of an item objectively. For example, the sentences used for describing a music CD, which is a commercial product on a Web site marketing music CDs, the sentences used for describing a television program on a Web site publishing an EPG (Electronic Program Guide), etc., are taken into the server apparatus 1, and are stored into the comment-data storage section 31 as the comments on those music CDs and the television programs.

By using the sentences used for a predetermined Web site as comments, namely, by making repeated use of them, the administrator of the server apparatus 1 can save the time and effort for creating new comments, etc., in order to present a recommendation reason.

The import of the comments into the server apparatus 1 may be carried out manually by the administrator of the server apparatus 1, or may be carried out by uploading from the terminal of the person who wrote the comments through the network 3.

A keyword selection section 32 refers to the comments stored in the comment-data storage section 31, and selects the word to be used for matching at the time of selecting a music CD to be recommended as a keyword from the words included in the comments.

FIG. 5 is a diagram illustrating an example of the keyword selection by the keyword selection section 32.

When the comment 51 including the sentence "proud of overwhelming originality . . ." is stored in the comment-data storage section 31, as shown by the point indicated by a solid-white arrow, the words "originality", "Japanese", "profundity", . . . , etc., are selected by the keyword selection section 32 as the keywords used for matching with the preference information at the time of selecting a music CD to be recommended. Also, a general word, such as "great", etc., that does not represent the user's preference and is not allowed to be used for matching is excluded from the keywords by the keyword selection section 32.

The keywords selected by the keyword selection section 32 are output to a meta-data generation section 35.

Referring back to the description of FIG. 4, a content storage section 33 stores the content (the data stored in each music CD).

A feature quantity extraction section 34 analyzes the contents stored in the content storage section 33, and extracts the feature quantity representing the feature of each content.

Figure 6:
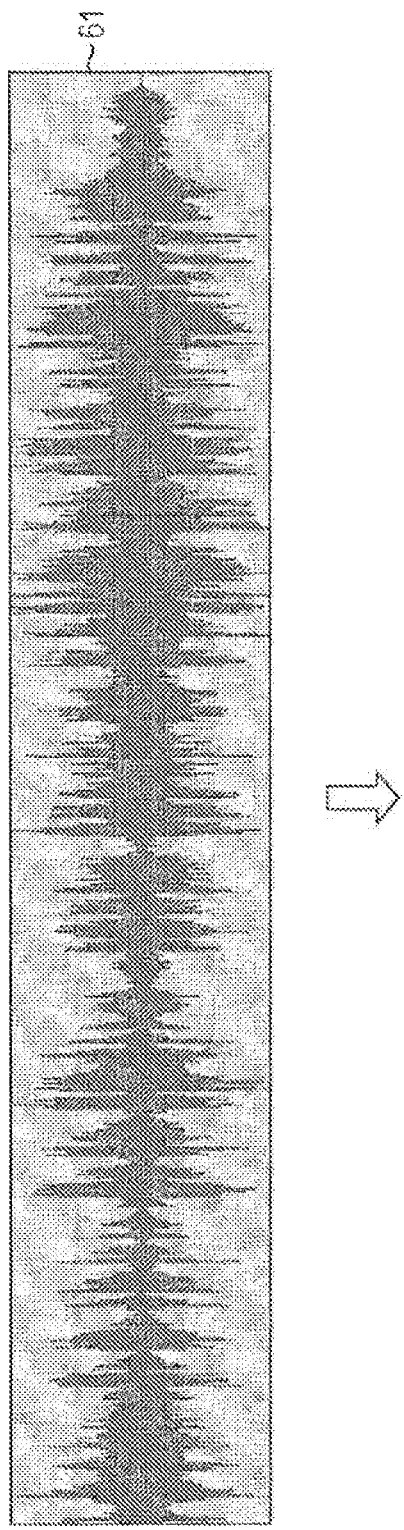
FIG. 6 is a diagram illustrating an example of the feature quantity extraction.

FIG. 6 is a diagram illustrating an example of the feature quantity extraction by the feature quantity extraction section 34.

When the content 61 of the waveform enclosed by a solid line is stored in the content storage section 33, the waveform is analyzed, and each feature is expressed numerically by the feature quantity extraction section 34 as shown by "tempo: 80" ($x_1$), "rhythm change: 120" ($x_2$), "low tone: 20" ($x_3$), "high tone 50" ($x_4$), . . . as shown by the point indicated by a solid-white arrow.

The feature quantity, which is expressed numerically by the feature quantity extraction section 34 in this manner is output to a meta-data generation section 35.

Referring back to the description of FIG. 4, the meta-data generation section 35 generates the meta-data from the keywords supplied from the keyword selection section 32 for each item (for each music CD) and the feature quantity supplied from the feature quantity extraction section 34, and stores the generated meta-data into a meta-data storage section 36.

Figure 7:
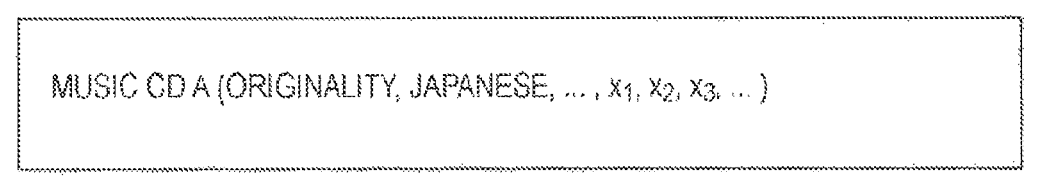

FIG. 7 is a diagram illustrating an example of the meta-data.

As shown in FIG. 7, the meta-data includes the keywords "originality", "Japanese", . . . , which were selected by the keyword selection section 32, and the feature quantities "$x_1$", "$x_2$", "$x_3$", . . . , which were extracted by the feature quantity extraction section 34. Such meta-data including the keywords and the feature quantities are used for the matching with the preference information transmitted from the user apparatus 2. In this regard, such meta-data may be created by the administrator of the server apparatus 1.

Referring back to the description of FIG. 4, a recommendation section 37 communicates with the user apparatus 2 through the network 3 by controlling the communication section 29. For example, when the user apparatus 2 requests the recommendations of music CDs, the recommendation section 37 selects a predetermined number of music CDs meeting the user's preference in accordance with the request. When the recommendation of music CDs are requested, the user apparatus 2 transmits the preference information representing the preference of the user.

As described below, the preference information includes the words obtained by verbalizing the user's preference. For example, the music CD whose meta-data includes the same keyword as the word included in the preference information, or the music CD whose meta-data includes the word related to the word included in the preference information as the keyword is selected. At this time, the word included in the preference information or the word related to it becomes the word that has served for the recommendation.

Also, the preference information also includes the feature quantity obtained by expressing the preference of the user numerically. At the time of selecting a music CD, the matching result between that feature quantity and the feature quantity included in the meta-data of the music CD is referenced. For example, out of the feature quantities included in the meta-data of the recommended music CD, when there is the feature quantity that is said to have served for the recommendation, because that quantity matched the feature quantity included in the preference information, the feature quantity is also verbalized, and the verbalized word or the word related to the verbalized word also becomes the word that has served for the recommendation.

Also, the recommendation section 37 reads the detailed information of the selected music CD and the comment from a detailed-information storage section 38 and a comment-data storage section 31, respectively. The recommendation section 37 generates recommendation screen information including the detailed information and the comment whose display format is processed by underlining the words that have served for the recommendation, etc., and for displaying the recommendation screen shown in FIG. 2. The recommendation section 37 transmits the generated recommendation screen information to the user apparatus 2 to display the recommendation screen.

The detailed-information storage section 38 stores the detailed information of each music CD.

A corresponding dictionary storage section 39 stores a dictionary describing the corresponding relationships among words. In the dictionary stored in the corresponding dictionary storage section 39, the relationships between the words having the same meanings one another, etc., are described, for example, "originality" and "creativity", "energetic" and "strong". The dictionary is referenced by the recommendation section 37 when a recommended music CD is selected.

Figure 8:
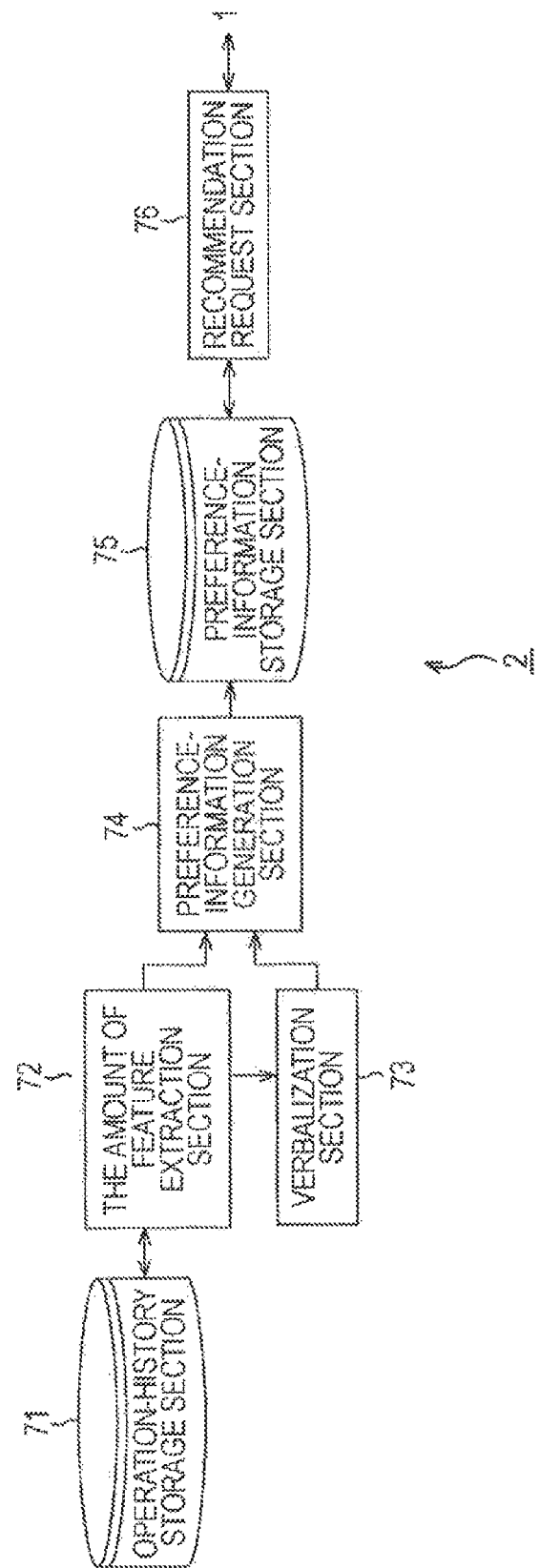
FIG. 8 is a block diagram illustrating an example of the functional configuration of a user apparatus.

FIG. 8 is a block diagram illustrating an example of the functional configuration of the user apparatus 2. At least a part of the functional sections shown in FIG. 8 is achieved by the CPU 21 (the CPU of the user apparatus 2) in FIG. 3 executing a predetermined program.

An operation-history storage section 71 stores the operation history of the user. When the user apparatus 2 has a function of playing back music, the meta-data indicating, for example the identification information of the pieces of music played back in accordance with the user's instruction, the number of playback times, and the category added to the music, etc., are stored.

A feature quantity extraction section 72 extracts the feature quantity of the music the user prefers, for example by analyzing the operation history stored in the operation-history storage section 71, or by analyzing the data of the music played back. For example, the feature quantity extraction section 72 extracts, as the feature quantities, the numerically-expressed information indicating what kind of music the user prefers, the tempo of the music the user prefers, rhythm changes, the appearance quantities of low tones, the appearance quantities of high tones, etc. The feature quantities extracted by the feature quantity extraction section 72 is output to a verbalization section 73 and the preference-information generation section 74.

The verbalization section 73 verbalizes the feature quantity representing the user's preference out of the feature quantities supplied from the feature quantity extraction section 72, and outputs the obtained word to the preference-information generation section 74.

Figure 9:
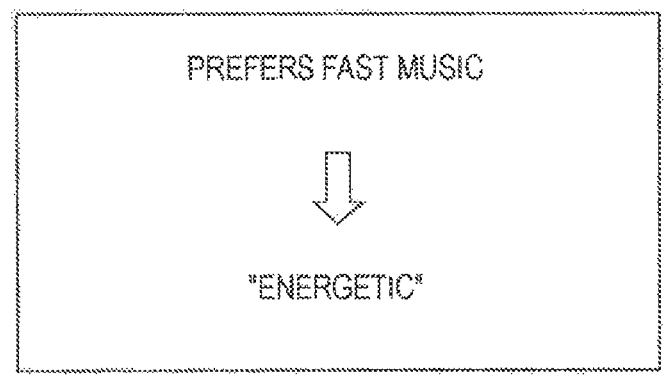
FIG. 9 is a diagram illustrating an example of verbalization of the feature quantity.

FIG. 9 is a diagram illustrating an example of the verbalization of the feature quantity.

As shown in FIG. 9, for example, when "prefers fast music" is expressed by the feature quantity supplied from the feature quantity extraction section 72, the verbalization section 73 verbalizes it into the word, which indicates the user's feature represented by the feature quantity, such as "energetic", etc., and is generally used in the comment of a music CD, etc., and outputs the obtained word "energetic" to the preference-information generation section 74.

That is to say, the verbalization section 73 has a dictionary showing the relationship between the feature quantity and the language, like "prefers fast music" and "energetic". This dictionary is, for example supplied from the administrator of the server apparatus 1.

Referring back to the description of FIG. 8, the preference-information generation section 74 generates the preference information indicating the user's preference from the feature quantity supplied from the feature quantity extraction section 72 and the words supplied from the verbalization section 73, and stores the generated preference information into a preference-information storage section 75.

Figure 10:
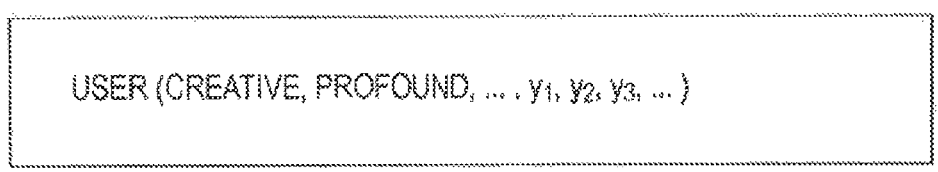
FIG. 10 is a diagram illustrating an example of preference information.

FIG. 10 is a diagram illustrating an example of the preference information.

As shown in FIG. 10, the preference information includes "creative", "profound", . . . , which were the words obtained by the verbalization by the verbalization section 73, and "$y_1$", "$y_2$", "$y_3$", . . . , which are the feature quantities extracted from the feature quantity extraction section 72. For example, if the feature quantity extracted by the feature quantity extraction section 72 shows that the user often listens to the music that has a different melody from a general music, "creative" as shown in FIG. 10 is included in the preference information as the word representing the user's preference.

The preference-information storage section 75 stores the reference information generated by the preference-information generation section 74.

A recommendation request section 76 communicates with the server apparatus 1 through the network 3 by controlling the communication section 29. For example, the recommendation request section 76 transmits the preference information stored in the preference-information storage section 75 to the server apparatus 1 in response to an instruction from the user, and requests a recommendation of the music CD meeting the user's preference.

Also, when the recommendation screen information is transmitted from the server apparatus 1, the recommendation request section 76 receives it, and displays the recommendation screen on the display (the output section 27 in FIG. 3) on the basis of the received recommendation screen information.

Next, a description will be given of the operations of the server apparatus 1 and the user apparatus 2, which have the above-described configuration.

First, with reference to the flowchart in FIG. 11, a description will be given of the processing of the server apparatus 1 displaying a recommendation screen onto the display of the user apparatus 2.

In step S1, when the user apparatus 2 requested the recommendation of the music CD meeting the user's request, the recommendation section 37 receives the request, and receives the preference information transmitted with the recommendation request.

In step S2, the recommendation section 37 performs matching of the meta-data stored in the meta-data storage section 36 and the preference information transmitted from the user apparatus 2 by appropriately referring to the dictionary stored in the corresponding dictionary storage section 39, and selects the music CD to be recommended. As described above, for example, the music CD having the meta-data including the same word, or the corresponding word as the word included in the preference information as a keyword, or the music CD having the meta-data including the feature quantity that matches the feature quantity included in the preference information is selected as the recommended music CD.

When the recommendation section 37 have selected the music CD to be recommended, in step S3, the recommendation section 37 temporarily stores the keyword that has served for the selection and the feature quantity, the processing proceeds to step S4, and reads out the comment of the selected music CD from the comment-data storage section 31. Also, at this time, the recommendation section 37 reads out the detailed information of the selected music CD from the detailed-information storage section 38.

In step S5, when the keyword temporarily stored (or the sentence including the keyword), or the word obtained by verbalizing the feature quantity temporarily stored is included in the comment, the recommendation section 37 processes the comment of the recommended music CD to have different display format from the other sentences by changing the color of the word (or the sentence including the keyword), or underlining the word, etc.

In step S6, the recommendation section 37 generates the recommendation screen information for displaying the recommendation screen using the detailed information read from the detailed-information storage section 38 and the comment information obtained by the process in the step S5, and transmits the generated recommendation screen information to the user apparatus 2. After that, the processing is terminated.

By the above processing, for example, when the preference information as shown in FIG. 10 is transmitted from the user apparatus 2, a search is made of the music CDs whose meta-data are stored in the meta-data storage section 36 for the music CDs whose meta-data include the same word as "creative", "profound", . . . , which are included in the preference information, or the word corresponding to that as the keyword. Also, a search is made for the music CDs having the meta-data including the feature quantity which is close to the feature quantities "$y_1$", "$y_2$", "$y_3$", . . . , which are the feature quantities included in the preference information.

For example, when the meta-data as shown in FIG. 7 is stored in the meta-data storage section 36, and "originality" and "creativity" are related in the dictionary stored in the corresponding dictionary storage section 39, or when the feature quantity included in both the preference information and the meta-data are close, the music CD having the meta-data in FIG. 7 is selected as the recommended music CD. Thus, for example "$x_1$", which is said to be the feature quantity that has served for selection in particular, is temporarily stored, because of the particular similarity of the keyword "originality" included in the meta-data with the user's feature quantity.

In this case, the comment is processed by underlining "originality" or by adding color to the sentence including "originality", etc. Also, when "originality" and "unique" are related, the comment is processed by underlining "unique", or by adding color to the sentence including "unique", etc.

Furthermore, the comment is processed for example, by underlining the word "profundity", etc., obtained by verbalizing the feature quantity "$x_1$", or by adding color to the sentence including "profundity".

Thus, for example, the recommendation screen information for displaying the recommendation reason 12 as shown in FIG. 2 is generated, and is transmitted to the user apparatus 2.

Figure 12:
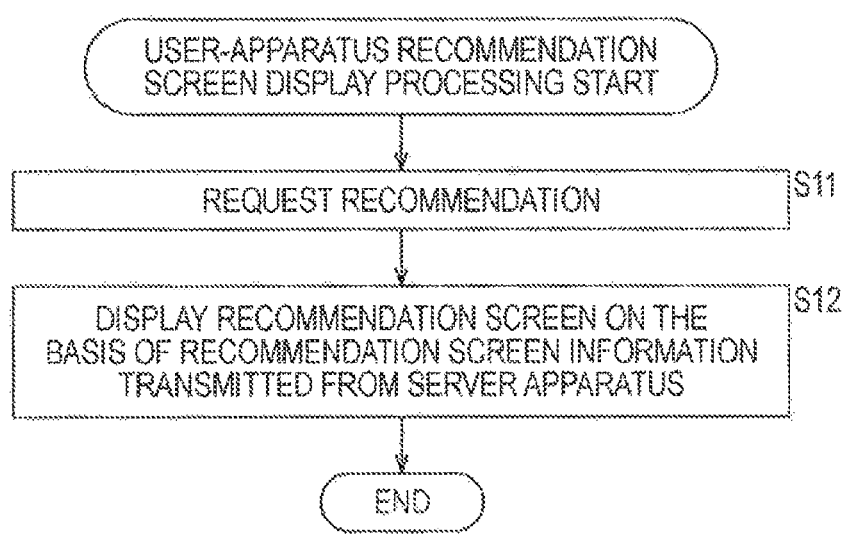
FIG. 12 is a flowchart illustrating the recommendation-screen display processing of the user apparatus.

Next, a description will be given of the processing of the user apparatus 2 displaying the recommendation screen with reference to the flowchart in FIG. 12.

In step S11, the recommendation request section 76 transmits the preference information stored in the preference-information storage section 75, and requests the recommendation of the music CD.

In response to the request made here, the server apparatus 1 performs the above-described processing, and transmits the recommendation screen information.

When the recommendation screen information is transmitted, in step S12, the recommendation request section 76 receives it, displays the recommendation screen on the basis of the received recommendation screen information, and terminates the processing.

By the above processing, for example the recommendation screen as shown in FIG. 2 is shown on the display of the user apparatus 2, thus the user confirms the recommendation reason, etc., and can purchase the recommended music CD from this screen.

In the above, the recommendation reason is assumed to be presented to the user together with the explanation of the item by displaying all the comment a part of which is processed in the display format. However, if only the recommendation reason should be presented, only the processed part out of all the comment may be extracted, and may be presented to the user. By this means, it is also possible to present a sentence, which is more interesting compared with the sentence, such as "Those who had selected the book you have selected also purchased the book XXX in addition."

Also, in the above, the meta-data of an item and the preference information representing the preference of the user include a word (keyword) and the feature quantity, and a recommended item should be selected by the server apparatus 1 by using these. However, the selection of the recommended item is not limited to the above-described information.

That is to say, when the meta-data and the preference information includes only the feature quantity, an item to be recommended may be selected from only the matching result of the feature quantity. In this case, for example, out of the feature quantities included in the meta-data of the selected item, the word obtained by verbalizing the feature quantity close to the feature quantity included in the preference information, or the word corresponding to that word and included in the comment of the recommended item is determined to be the word that has served for the selection of the item.

In this regard, in the above, it is assumed that the presentation of the recommendation reason is achieved by the server apparatus 1 having the function shown in FIG. 4 and the user apparatus 2 having the function shown in FIG. 8. However, the division of the functions held by the server apparatus 1 and the user apparatus 2 is not limited to this.

For example, as a first division, the function held by the user apparatus 2 may be only the display function (browser function) of the item information and the recommendation reason, and the other functions including the function of managing the information, such as an operation history, may be held by the server apparatus 1.

That is to say, in this case, the server apparatus 1 is provided with the operation-history storage section 71, the feature quantity extraction section 72, the verbalization section 73, the preference-information generation section 74, and the preference-information storage section 75 in FIG. 8. Every time the user apparatus 2 performs a predetermined operation, the information indicating the contents is uploaded to the server apparatus 1. The server apparatus 1 generates the user's preference information on the basis of the uploaded information, and when the user apparatus 2 (browser) requests the recommendation of an item, the server apparatus 1 uses the user's preference information. The server apparatus 1 selects an item, generates the recommendation screen information by each section shown in FIG. 4, and transmits the information to the user apparatus 2.

Also, as a second division, the user apparatus 2 may be provided with the recommendation section 37 in FIG. 4, and the user apparatus 2 itself may make a selection of an item. In this case, for example, the user apparatus 2 is provided with a storage section for storing the meta-data of the music data held by the user apparatus 2, and the recommendation section 37 recommends an item (music data) on the basis of the meta-data. The comment data used for crating the recommendation screen information, etc., is obtained by the recommendation section 37 of the user apparatus 2 from the server apparatus 1 as necessary, and the item information and the recommendation reason are displayed on the basis of the recommendation screen information generated by the recommendation section 37.

Furthermore, as a third division, the user apparatus 2 may be provided with the keyword selection section 32, the feature quantity extraction section 34, the meta-data generation section 35, and the meta-data storage section 36, etc., as necessary in addition to the comment-data storage section 31 in FIG. 4. The processing may not be performed between the server and client, but the user apparatus 2 may perform, so-called in a self-contained way, the selection of an item and the generation of recommendation screen information to display the item information and the recommendation reason.

Also, in the above, the verbalization based on the feature quantity of the user is carried out by the verbalization section 73 of the user apparatus 2, and the word is provided as the word to be used for the selection of the item to be recommended. However, for example, when a music content, etc., is downloaded from a predetermined server, the user apparatus 2 may be provided with the word by downloading the word representing the feature of the music content as meta-data at the same time. In this case, when the recommendation request section 76 of the user apparatus 2 requests the recommendation of an item, the recommendation request section 76 requests the recommendation of the item by transmitting the preference information including the word information provided by the downloading to the server apparatus 1.

In the above, the comment a part of which is processed in the display format is assumed to be presented to the user. However, the user may select the underlined word in the comment, which has been processed in the display format in that way. For example, the server apparatus 1 selects another item from the word selected by the user, and the information of the selected item is presented to the user. In this regard, when information indicating the degree of a relationship between the word and the item provider is stored in the user apparatus 2, and the user apparatus 2 can perform such processing.

The underlined words are the words that have served for the selection of the item, and also are the words representing the reason of the recommendation of that item. Thus, another item related to the item recommended before is selected by so-called the connection of recommendation reason, and is recommended to the user.

Figure 13:
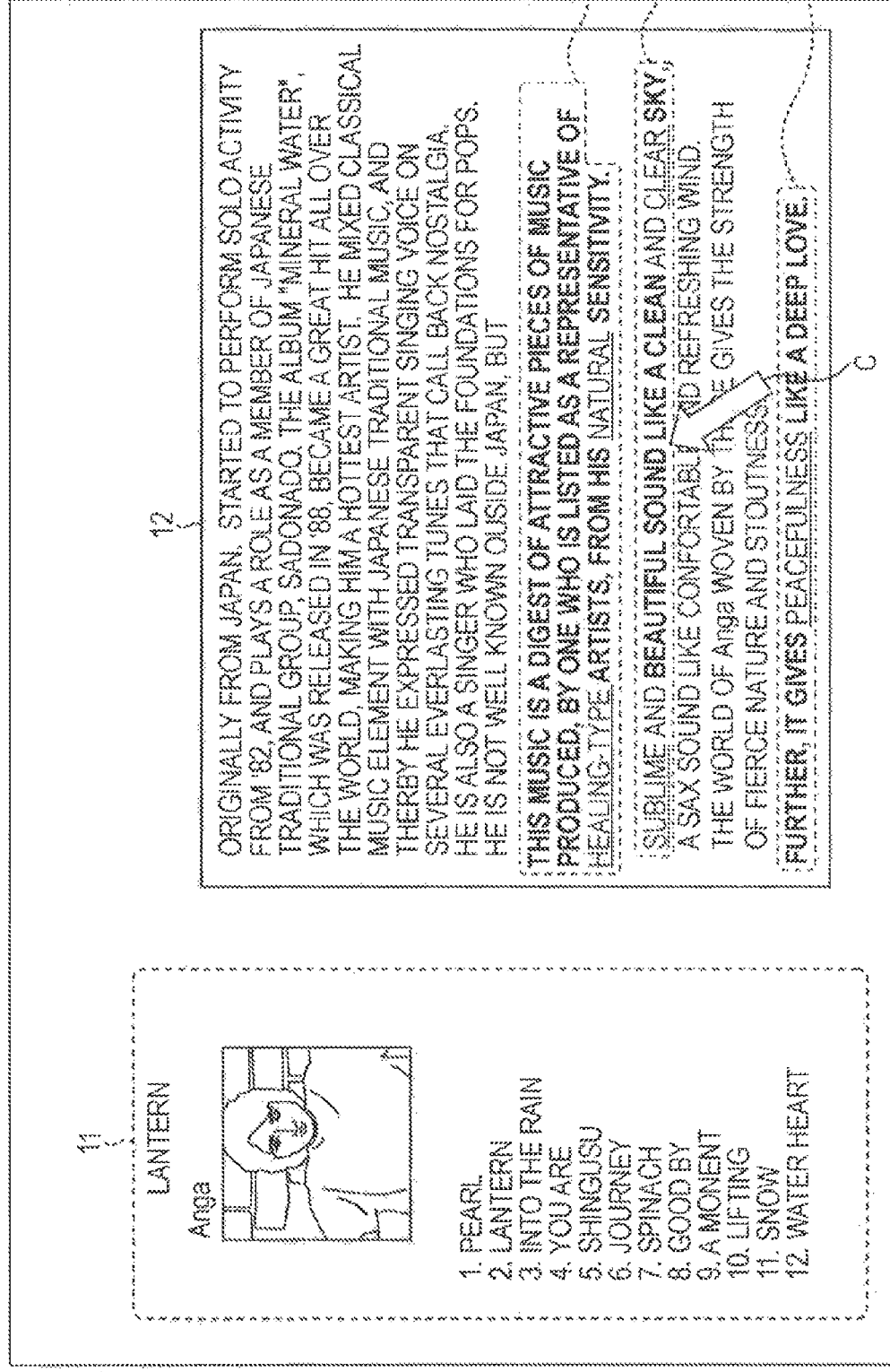
FIG. 13 is a view illustrating another example of a recommendation screen.

FIG. 13 is a view illustrating another example of the recommendation screen displayed by the user apparatus 2. The same parts as those in FIG. 2 are marked with the same reference letters and numerals.

In the example of the recommendation screen of the music CD shown in FIG. 13, the music CD of the artist name "Anga" and the title "Lantern" is recommended as the music CD meeting the user's preference. The artist name and title, and the titles of the pieces of music included in the music CD "Lantern" are displayed as the detailed information 11.

Also, in the example in FIG. 13, a comment on the music CD "Lantern" is displayed as the recommendation reason 12. Of the sentences included in this comment, sentences 12D to 12F enclosed by the dotted lines are sentences that are displayed in a different format from those of the other sentences, for example by a striking color, such as red.

The word "healing-type" and "natural" included in the sentence 12D, the word "clear" and "sublime" included in the sentence 12E, and the word "peacefulness" included in the sentence 12F are underlined. These words are presented to the user as the words that have served for the recommendation of the music CD "Lantern".

For example, when such a screen is displayed, the user of the user apparatus 2 operates the mouse, etc., to move the cursor C onto an underlined word, carries out a predetermined operation, and thereby can select the word. The information on which word has been selected is notified from the user apparatus 2 to the server apparatus 1.

Figure 14:
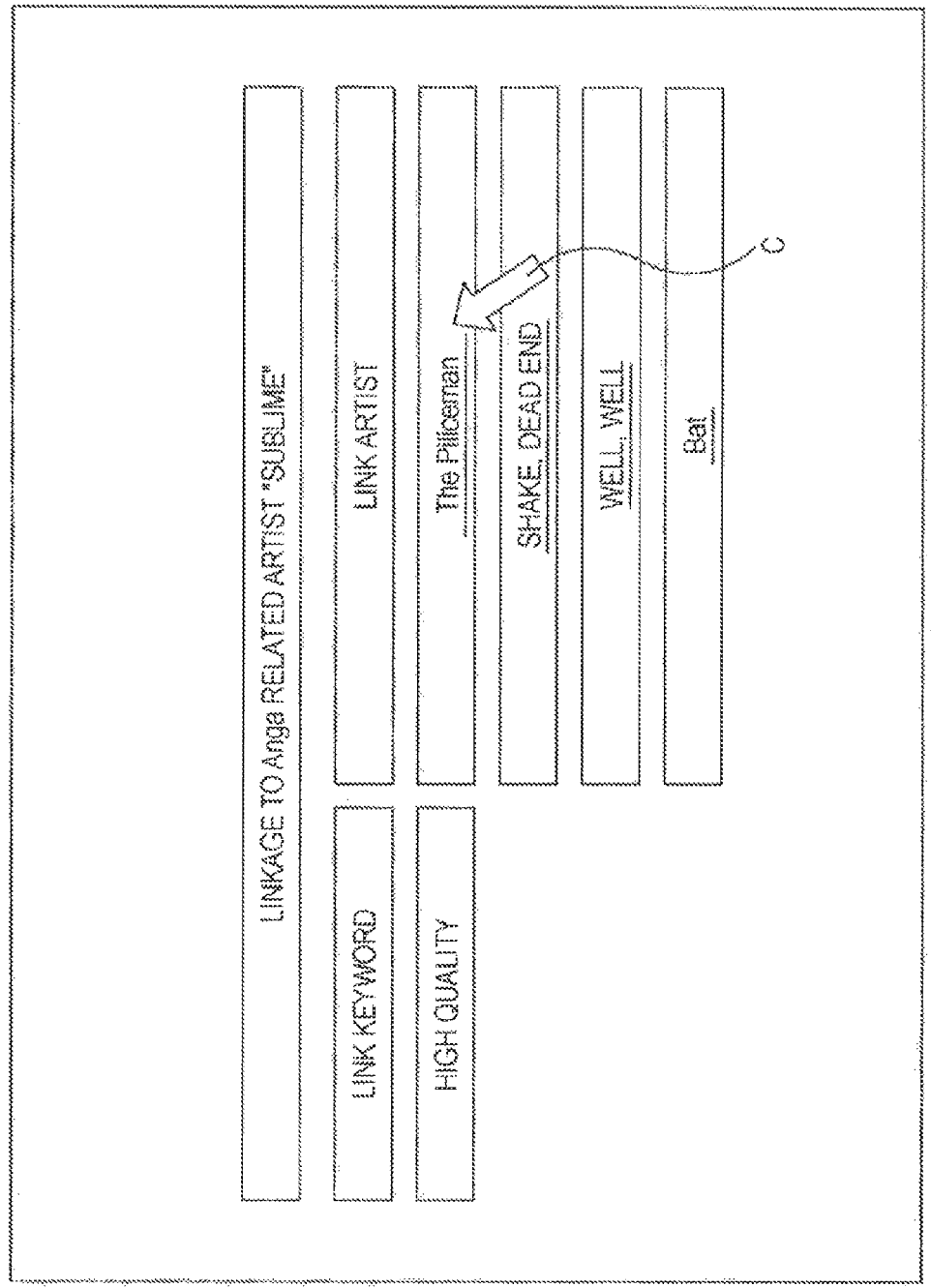
FIG. 14 is a diagram illustrating an example of the screen on which a list of artist names is displayed.

FIG. 14 is a diagram illustrating an example of the screen displayed on the user apparatus 2 in place of the screen in FIG. 13 when "sublime" included in the sentence 12E is selected.

As shown in FIG. 14, on the screen displayed in place of the screen in FIG. 13, the character "Linkage to Anga related artist "sublime"" is displayed, and shows that the artist names displayed in the lower part are the artist names selected in connection with the word "sublime" that the user selected from the screen in FIG. 13.

In the server apparatus 1, a representative word is related to each word displayed with an underline, and artists who are providers of the music CD are related to the representative word. Accordingly, when an underlined word is selected by the user, the representative word related to that word is searched, and subsequently, a search is made for the artists related to the representative word obtained as a search result.

The example in FIG. 14 shows that the representative word (link keyword) is "high quality", and on the right thereof, four artists names "The Policeman", "Shake, Dead end", "Well, Well", and "Bat" are displayed in a list of the names of the artists (link artists).

That is to say, in this example, the representative word to which "sublime" selected by the user is related is "high quality". The artists (the feature quantity) "The Policeman", "Shake, Dead end", "Well, Well", and "Bat" are related to "high quality".

Figure 15:
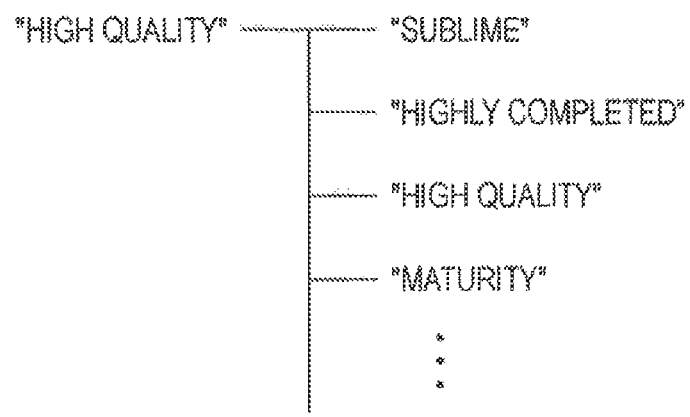
FIG. 15 is a diagram illustrating an example of a relationship between words and a representative word.
Figure 16:
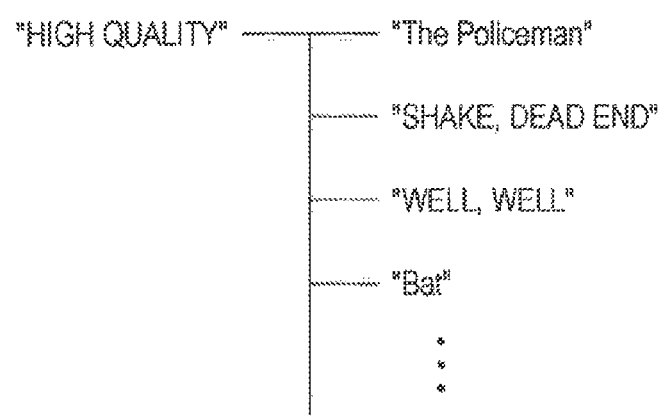
FIG. 16 is a diagram illustrating an example of a relationship between a representative word and artists.

FIG. 15 is a diagram illustrating an example of the relationship between the words (the words presented with an underline) and a representative word. FIG. 16 is a diagram illustrating an example of the relationship between a representative word and artists.

As shown in FIG. 15, in the server apparatus 1, for example the words "sublime", "highly completed", "high quality", "maturity", . . . , etc., are related to "high quality" as the representative word. Also, as shown in FIG. 16, the artists "The Policeman", "Shake, Dead end", "Well, Well", and "Bat", . . . , etc., are related to the representative word, "high quality".

When such a relationship is made in the server apparatus 1, not only when "sublime" is selected, but the words "highly completed", "high quality", and "maturity", which are displayed with an underline in the comment of a predetermined music CD, "The Policeman", "Shake, Dead end", "Well, Well", and "Bat" are presented as the artists linked to the respective words "highly completed", "high quality", and "maturity".

In this regard, a degree of relationship indicating the degree of a relationship with a representative word is set for each artist in advance. When a list of artists is displayed on the screen of the user apparatus 2, the sort sequence becomes a descending order of relationships with the representative word. In the example in FIG. 14, "The Policeman", "Shake, Dead end", "Well, Well", and "Bat" are shown in descending order of the degree of a relationship with the representative word.

The dictionary, as shown in FIG. 15, representing a relationship between a word and a representative word, and the dictionary, as shown in FIG. 16, representing a relationship between a representative word and an artist are stored in the corresponding dictionary storage section 39 of the server apparatus 1 in advance. When the display of a list of artists and the processing enabling the user to select music CDs provided by the artists is performed in the user apparatus 2, the dictionary as shown in FIG. 16 is managed by the user apparatus 2.

Referring back to the description in FIG. 14, when a list of artists is displayed, the user of the user apparatus 2 moves the cursor C onto any one of artist names, carries out a predetermined operation, and thereby can select the word. The information on which artist has been selected is notified from the user apparatus 2 to the server apparatus 1.

In the server apparatus 1, the music CD meeting the user's preference is selected from the music CDs provided by the artists selected by the user by the matching between the preference information representing the user's preference and the meta-data to the music CD (item) as described above. The information of the selected music CD is presented to the user as the information on the recommended item. As described above, when the dictionary as shown in FIG. 16 is managed by the user apparatus 2, the matching and the processing to present the music CD selected by the matching is performed by the user apparatus 2.

Figure 17:
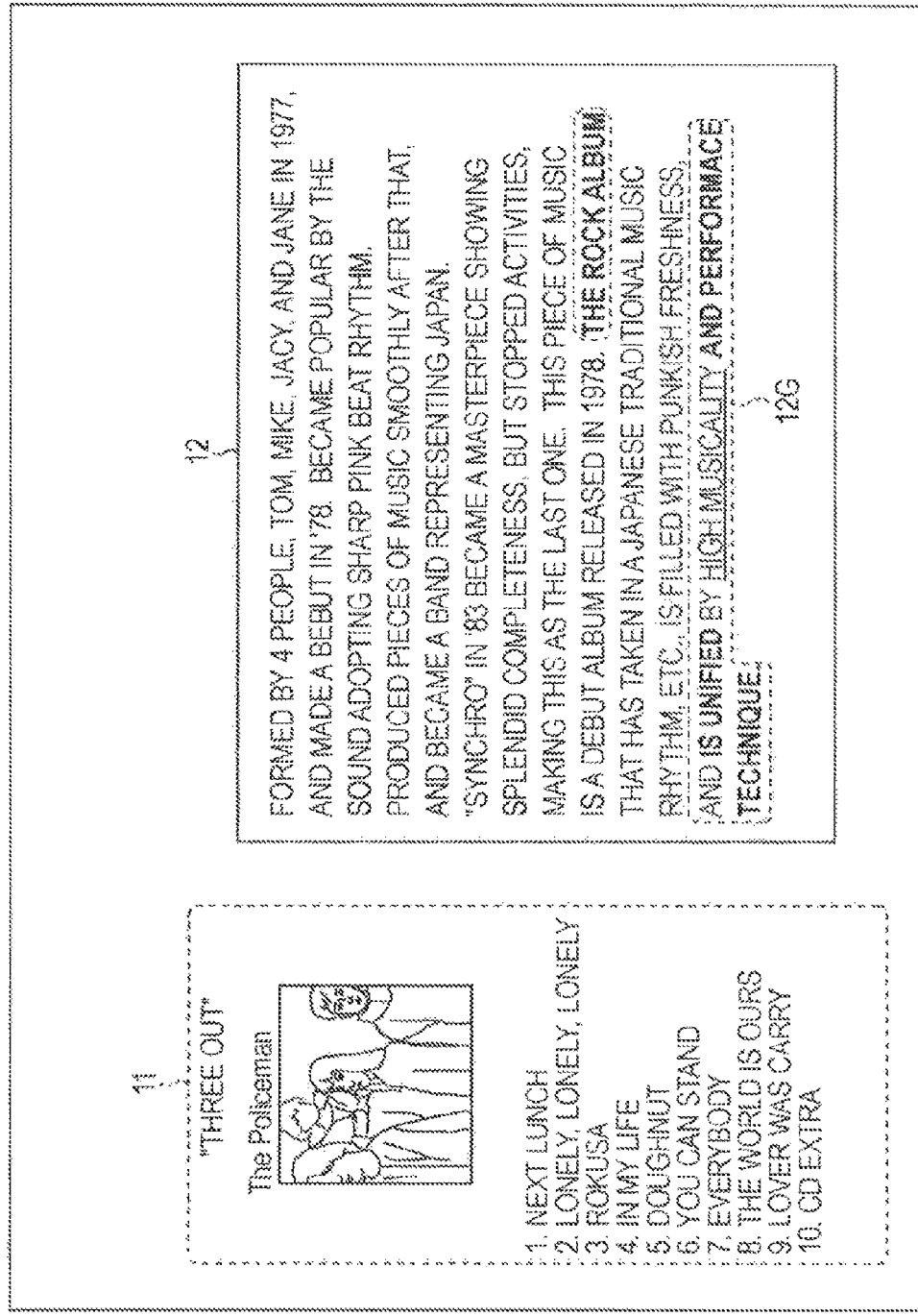
FIG. 17 is a view illustrating still another example of a recommendation screen.

FIG. 17 is a view illustrating an example of a screen displayed on the user apparatus 2 in place of the screen in FIG. 14 when "The Policeman" is selected from the artists displayed in a list. The configuration of the screen shown in FIG. 17 has basically the same configuration as the screen configuration shown in FIG. 2 and FIG. 13. The same parts are marked with the same reference letters and numerals.

In the example of the recommendation screen of the music CD shown in FIG. 17, the music CD having the artist name "The Policeman" and the title "Three Out" is recommended. The artist name, title, and the titles of the pieces of music included in the music CD "Three Out" are displayed as detailed information 11. The music CD "Three Out" has been selected by the matching between the preference information and items of meta-data as the music CD meeting the user's preference out of the music CDs provided by "The Policeman".

In the example in FIG. 17, a comment on the music CD "Thee Out" is displayed as the recommendation reason 12. Of the sentences included in this comment, a sentence 12G enclosed by the dotted lines is a sentence that is displayed in a different format from those of the other sentences. The word "high musicality" included in the sentence 12G is underlined. "High musicality" is presented to the user as the word that has served for the recommendation of the music CD "Thee Out".

By selecting "high musicality" from the recommendation screen in FIG. 17, the user of the user apparatus 2 can cause the server apparatus 1 to search, using "high musicality" as a starting point, the music CDs related to it in the same manner as the time of selecting "sublime" from the recommendation screen in FIG. 13. In the server apparatus 1, when "high musicality" is selected, the representative word related to "high musicality" is searched, and the artists related to the representative word are searched. When the artist names of the search result are presented, and a predetermined artist is selected, the music CD meeting the user's preference is selected from the music CDs provided by the selected artist.

In this manner, the user of the user apparatus 2 can receive the recommendation of related items by making a selection of an underlined word from the comment displayed for the recommendation reason every time the comment of a different item is displayed.

Compared with the recommendation in connection with an item, in which the item, which has been purchased by the other person having the similar preference, is recommended by presenting the recommendation reason, such as "Those who selected the book you have selected also have purchased the book XXX in addition", the above-described recommendation in connection with a recommendation reason (the words displayed with an underline) itself, which has the recommendation reason of a certain item as a starting point, has a wider variety of items which are possible to be recommended. Thus, it is thought that an item can be selected from a larger number of items.

In this regard, the word that is selected from the comment (the word displayed with an underline) is said to be an interesting word for the user who has selected that word, and thus the user's preference information may be updated in response to the selected word.

Here, with reference to the flowchart in FIG. 18, a description will be given of the processing of the server apparatus 1, in which an artist is searched from a word, and an item to be recommended is selected from the items provided by the artist obtained as the search result.

Figure 11:
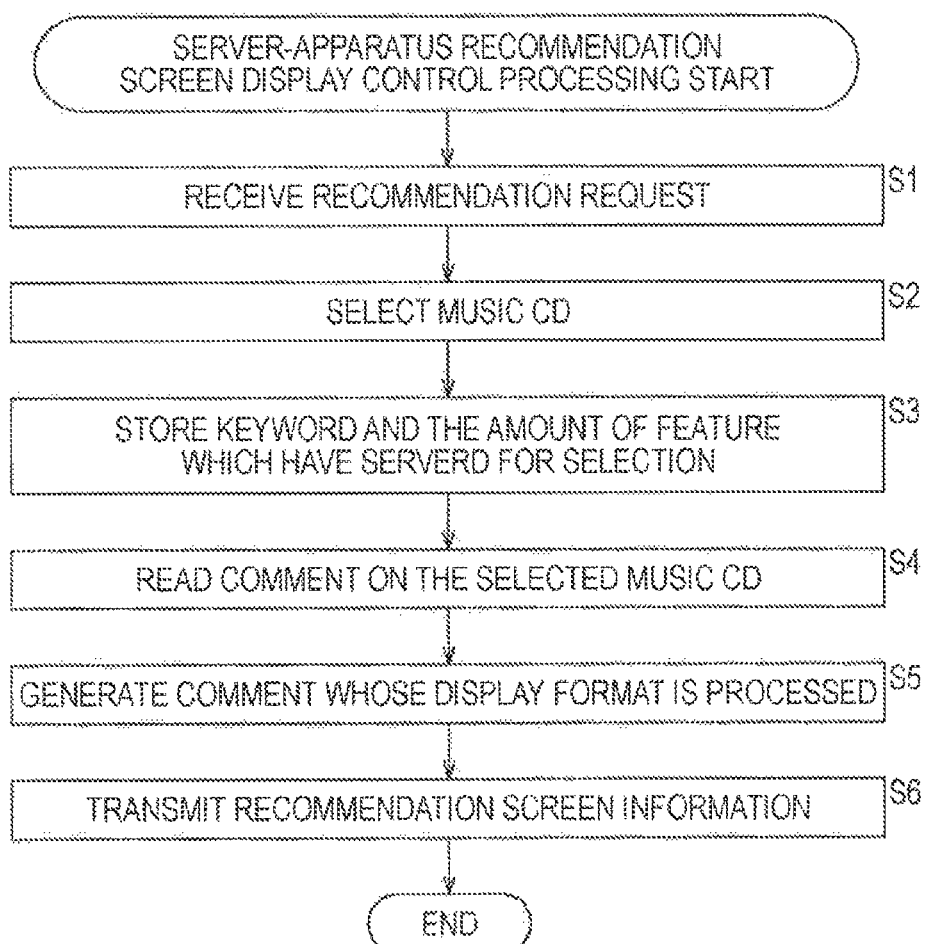
FIG. 11 is a flowchart illustrating the recommendation-screen display control processing of the server apparatus.

This processing is started after the processing in FIG. 11 is performed. When the processing in FIG. 11 has been performed, the user apparatus 2 performs the processing in FIG. 12, and the screen, as shown in FIG. 13, for recommending an item is displayed.

When the user of the user apparatus 2 has selected any of the words from the words displayed with underlines, in step S21, the recommendation section 37 of the server apparatus 1 receives the word selected by the user as the preference keyword.

In step S22, the recommendation section 37 selects a representative word to which the preference keyword is related with reference to the dictionary stored in the corresponding dictionary storage section 39.

In step S23, the recommendation section 37 selects artists related to the representative word with reference to the dictionary stored in the corresponding dictionary storage section 39. The recommendation section 37 sorts the names of the selected artists in descending order of the degree of relationship with the representative word, and displays them in a list onto the screen of the user apparatus 2.

When the user of the user apparatus 2 has selected any one of the artists, in step S24, the recommendation section 37 receives the selection of the artist, and performs the processing of step S25 and after that. The processing from steps S25 to S29 is the same processing as the processing from steps S2 to S6 described with reference to the flowchart in FIG. 11.

That is to say, in step S25, the recommendation section 37 appropriately performs matching of the meta-data stored in the meta-data storage section 36 and the preference information transmitted from the user apparatus 2 with reference to the dictionary stored in the corresponding dictionary storage section 39, and selects the music CD to be recommended from the music CDs provided by the artist selected by the user.

In step S26, the recommendation section 37 temporarily stores the keyword that has served for selection and the feature quantity, the processing proceeds to step S27, and the recommendation section 37 reads out the comment of the selected music CD from the comment-data storage section 31. Also, at this time, the recommendation section 37 reads out the detailed information of the selected music CD from the detailed-information storage section 38.

In step S28, when the keyword temporarily stored (or the sentence including the keyword), or the word obtained by verbalizing the feature quantity temporarily stored is included in the comment, the recommendation section 37 processes the comment of the recommended music CD to have different display format from the other sentences by changing the color of the word (or the sentence including the keyword), or underlining the word, etc.

In step S29, the recommendation section 37 generates the recommendation screen information for displaying the recommendation screen using the detailed information read from the detailed-information storage section 38 and the comment information obtained by the process in the step S28, and transmits the generated recommendation screen information to the user apparatus 2. After that, the processing is terminated.

In the user apparatus 2, information on the item selected in connection with the recommendation reason is displayed on the screen as shown in FIG. 17, and the user can confirm the information of the item.

The above-described series of processing may be executed by hardware, but also may be executed by software.

When the series of processing is executed by software, the programs constituting the software are built in a dedicated hardware of a computer. Alternatively, the various programs are installed, for example in a general-purpose personal computer capable of executing various functions from a network or a program recording medium.

As shown in FIG. 3, the recording media include not only a removable media 31 including a magnetic disk (including a flexible disk) recording programs, an optical disc (including a CD-ROM (Compact Disk-Read Only Memory) and a DVD (Digital Versatile Disk)), a magneto-optical disc (including MD (a registered trademark) (Mini-Disk)), or a semiconductor memory, which are distributed in order to provide a user with the programs separately from the apparatus main unit. Also the recording media include the ROM 22, which is provided to the user in a built-in state in the apparatus main unit, the hard disk included in the storage section 28, and the like.

In this regard, in this specification, each step includes the processing to be performed in time series in accordance with the described sequence as a matter of course. Also, each step includes the processing which is not necessarily executed in time series, but is executed in parallel or individually.

Also, in this specification, a system may be constituted by one apparatus, or may represent the entire apparatus including a plurality of apparatuses. When a system represents the entire apparatus including a plurality of apparatuses, individual apparatuses can be connected to one another through a network, such as the Internet.

The invention claimed is:

1. An information processing apparatus, comprising:
   a memory for storing an operation history of a user, and content data on an item, the operation history including comment information regarding the user's comment on the item, the comment information being in a form of sentences describing the item; and
   processing circuitry configured to
      select a keyword from words in the operation history;
      extract a feature quantity of the content data;
      verbalize the feature quantity in the form of a word corresponding to the feature quantity, based on a dictionary that shows a relationship between the feature quantity and the word;
      process the operation history of the user to determine user preference information based on the operation history;
      match the selected keyword and the word corresponding to the feature quantity with the determined user preference information;
      provide one or more recommendations and one or more reasons for the recommendations based on the matching result; and
      control a display control configured to display the one or more recommendations with the one or more reasons.

2. The apparatus according to claim 1, wherein the operation history includes information regarding the user's impression on the item.

3. The apparatus according to claim 1, wherein the processing circuitry is further configured to:
   control presentation of information on the item selected in accordance with the user's preference by displaying the word corresponding to the feature quantity in a format different from other words out of words constituting a comment, the word contributing to the selection of the item.

4. The apparatus according to claim 3,
   wherein the processing circuitry is configured to control presentation of information on the item selected in accordance with the user's preference such that a sentence including a plurality of words including a word having served for the selection of the item is further displayed in a format different from other sentences constituting the comment.

5. The apparatus according to claim 3,
   wherein the processing circuitry is configured to display information on the item selected in accordance with the user's preference onto a screen of a user apparatus connected through a network.

6. The apparatus according to claim 3, wherein the comment information is used for displaying information on the item on a predetermined web site.

7. The apparatus according to claim 3,
   wherein a word having served for the selection of the item is the same word as the word included in preference information representing the user's preference, or the word corresponding to the word included in the preference information out of words included in meta-data of the item referenced at the time of selecting the item.

8. The apparatus according to claim 3, wherein a word having served for the selection of the item is the word obtained by verbalizing the feature quantity close to the feature quantity included in preference information representing the user's preference out of the feature quantity included in meta-data of the item referenced at the time of selecting the item.

9. The apparatus according to claim 3, wherein the processing circuitry is further configured to store information indicating a relationship with a predetermined feature quantity, wherein when a predetermined word is selected from words displayed in a format different from the other words as a word having served for the selection of the item, the control section is configured to select the feature quantities related to the selected predetermined word on the basis of the information stored in the other storage section, and is configured to display a list of the selected feature quantities.

10. The apparatus according to claim 9, wherein when the item to be selected is music, the feature quantity is an artist, and when the item to be selected is a movie, the feature quantity is a director.

11. The apparatus according to claim 9, wherein the processing circuitry is configured to store information indicating a degree of a relationship between a word and a predetermined feature quantity, and is configured to present a list of the feature quantities in descending order of the degree of the relationship.

12. The apparatus according to claim 9, wherein when a predetermined feature quantity is selected from the list, the processing circuitry is configured to control presentation of information on the item such that a word having served for the selection of the item is displayed in a format different from other words out of the words constituting the comment on the item selected from the items provided by the predetermined feature quantity.

13. An information processing method, the method comprising:
storing, in a memory, an operation history of the user, and content data on an item, the operation history including comment information regarding the user's comment on the item, the comment information being in a form of sentences describing the item;
selecting a keyword from words in the operation history;
extracting a feature quantity of the content data;
verbalizing the feature quantity in the form of a word corresponding to the feature quantity, based on a dictionary that shows a relationship between the feature quantity and the word;
processing the operation history of the user to determine user preference information based on the operation history;
matching, using processing circuitry, the selected keyword and the word corresponding to the feature quantity with the determined user preference information;
providing one or more recommendations and one or more reasons for the recommendations based on the matching result; and
controlling a display to display the one or more recommendations with the one or more reasons.

14. A non-transitory computer-readable medium including instructions, executable by a processor, to cause an information processing apparatus to perform a method, the method comprising:
storing an operation history of the user and content data on an item, the operation history including comment information regarding the user's comment on the item, the comment information being in a form of sentences describing the item;
selecting a keyword from words in the operation history;
extracting a feature quantity of the content data;
verbalizing the feature quantity in the form of a word corresponding to the feature quantity, based on a dictionary that shows a relationship between the feature quantity and the word;
processing the operation history of the user to determine user preference information based on the operation history;
matching the selected keyword and the word corresponding to the feature quantity with the determined user preference information;
providing one or more recommendations and one or more reasons for the recommendations based on the matching result; and
controlling a display to display the one or more recommendations with the one or more reasons.

* * * * *